United States Patent [19]

Cheng et al.

[11] 4,410,446

[45] Oct. 18, 1983

[54] ZINC OXIDE DISPERSIONS BY DECOMPOSITION OF ZINC ACETATE

[75] Inventors: William J. Cheng; David B. Guthrie, both of St. Louis, Mo.

[73] Assignee: Petrolite Corporation, St. Louis, Mo.

[21] Appl. No.: 46,594

[22] Filed: Jun. 7, 1979

[51] Int. Cl.³ ............................................. B01J 13/00
[52] U.S. Cl. .................................... 252/309; 106/296; 252/314; 252/389 R; 424/145
[58] Field of Search ................ 252/309, 314; 423/622; 106/296; 424/145; 430/87, 89

[56] References Cited

U.S. PATENT DOCUMENTS 2,671,758 3/1954 Vinograd et al. ..................... 252/18
2,676,925 4/1954 Lindstrom et al. ............. 252/309 X
3,674,476 7/1972 Tamai et al. ..................... 423/622 X
3,676,342 7/1972 Gathman et al. ............... 252/309 X

OTHER PUBLICATIONS

Comprehensive Inorganic Chemistry, J. C. Bailar, Jr., Edit., vol. 3, Pergamon Press Ltd., 1973, pp. 235 and 236.

*Primary Examiner*—Richard D. Lovering
*Attorney, Agent, or Firm*—Sidney B. Ring; Hyman F. Glass

[57] ABSTRACT

This invention relates to stable, fluid zinc-containing dispersions and the preparations thereof by the high temperature decomposition of zinc acetate to ZnO in a dispersant-containing fluid, said dispersant being stable at the temperature of decomposition.

4 Claims, No Drawings

ZINC OXIDE DISPERSIONS BY DECOMPOSITION OF ZINC ACETATE

Dispersions of magnesium-containing compounds have been heretofore prepared by various methods. One such method, which involves the reaction of Mg metal with an alcohol to form an intermediate magnesium alkoxide, is a complicated multi-stepped process. The following are illustrative:

U.S. Pat. No. 2,570,058
U.S. Pat. No. 2,582,254
U.S. Pat. No. 2,593,314
U.S. Pat. No. 2,692,239
U.S. Pat. No. 2,788,325
U.S. Pat. No. 2,834,662
U.S. Pat. No. 2,895,913
U.S. Pat. No. 2,939,808
U.S. Pat. No. 3,018,172
U.S. Pat. No. 3,150,089
Belgian Pat. No. 842,131
Belgian Pat. No. 818,960
Ulric B. Bray, Charles R. Dickey and Vanderveer Voorhees Ind. Eng. Chem., Prod. Res. Dev., 14, 295-8 (1975).

Other processes employing already formed MgO, although not considered suitable by Bray, Dickey and Voorhees (loc. cit.), are illustrated by the following:

U.S. Pat. No. 3,018,172
U.S. Pat. No. 3,524,814
U.S. Pat. No. 3,629,109
U.S. Pat. No. 3,865,737
U.S. Pat. No. 3,928,216
Belgian Pat. No. 817,035
Netherlands Application No. 6,410,242

Ser. No. 816,626 filed July 18, 1977, now U.S. Pat. No. 4,229,309, relates to stable, fluid magnesium-containing dispersions, and the preparation thereof, by the high temperature dehydration of $Mg(OH)_2$ to MgO in a dispersant-containing fluid.

Ser. No. 840,192 filed Oct. 17, 1977, now U.S. Pat. No. 4,179,383, and Ser. No. 853,600 filed Nov. 21, 1977, now U.S. Pat. No. 4,163,728, relate to stable, fluid magnesium-containing dispersions, and the preparation thereof, by the high temperature decomposition of magnesium carboxylates such as magnesium acetate to MgO in a dispersant-containing fluid.

Ser. No. 885,150 filed Mar. 10, 1978, now U.S. Pat. No. 4,226,739, relates to stable, fluid magnesium-containing dispersions and the preparation thereof by the high temperature decomposition of $MgCO_3$ to MgO in a dispersant-containing fluid.

Not all metal compounds behave similarly. For example, in Ser. No. 894,979 filed Apr. 10, 1978, now U.S. Pat. No. 4,164,472, there is described and claimed a process where calcium acetate is decomposed in a dispersant-containing fluid to yield calcium carbonate instead of calcium oxide. This is in contrast to an analogous process employing magnesium acetate where MgO is obtained under similar conditions.

Ser. No. 953,983 filed Oct. 23, 1978, now U.S. Pat. No. 4,193,769, relates to a facile method of preparing stable, fluid zinc-containing dispersions which comprises heating $ZnCO_3$ in the presence of a fluid of low volatility containing a dispersing agent soluble in said fluid to effect its decomposition into ZnO and $CO_2$ at temperatures substantially lower than required when $ZnCO_3$ in the dry state is decomposed into the aforesaid products.

The process of Ser. No. 953,983, now U.S. Pat. No. 4,193,769, in essence, comprises an almost "explosive" decomposition of zinc carbonate to zinc oxide according to the equation $$ZnCO_3 \rightarrow ZnO + CO_2$$

During this decomposition, $ZnCO_3$ is disintegrated into minute particles of ZnO which are immediately suspended and become stabilized in the fluid by the presence of a dispersing agent.

It is general practice in the decomposition process, as discussed above, to employ dispersions which react with the metal compound involved to form a salt or other complex. For example, where a carboxylic, sulfonic, naphthenic, etc. acid is employed, salts of the metal compound decomposed are formed. Thus, where $ZnCO_3$ is decomposed in the presence of naphthenic acid, zinc naphthenate is formed as the dispersant.

In Ser. No. 953,983, now U.S. Pat. No. 4,193,769, where $ZnCO_3$ is decomposed in the presence of zinc naphthenate, although in practice the reaction temperature reaches above about 300°, a fluid stable dispersion is formed. However, when zinc acetate is decomposed in the presence of zinc naphthenate a two phase non-dispersed product is formed. Unexpectedly, we have found that where a dispersant which is stable at a decomposition temperature, such as magnesium naphthenate is employed in place of a non-stable dispersant such as zinc naphthenate, in decomposing Zn acetate, a stable fluid dispersion is unexpectedly formed.

We have found that stable fluid dispersions of zinc oxide can be prepared by decomposing zinc acetate provided a dispersant is employed which is heat stable at the temperature and conditions employed for decomposition of the zinc acetate which is generally above about 270° C. and preferably about 300° C.

In Ser. No. 953,983 filed Oct. 23, 1978, now U.S. Pat. No. 4,193,769, we found that zinc carbonate could be converted to stable fluid zinc oxide dispersions when heated to temperatures above 200° C. in the presence of zinc naphthenate dispersant. In contrast, when zinc acetate is heated at temperature above 270° C. in the presence of zinc naphthenate one does not obtain the desired ZnO dispersion.

We have now found that when zinc acetate is heated in the presence of a more heat stable dispersant, such as magnesium naphthenate, one unexpectedly obtains the desired stable fluid dispersion of zinc oxide.

Any suitable zinc acetate capable of being subdivided upon decomposition into submicron particles of zinc oxide can be employed.

Any suitable non-volatile process fluid capable of being heated to the decomposition temperature of zinc acetate can be employed. The process fluid should be relatively stable and relatively non-volatile at the decomposition temperature. However, any volatility encountered is readily controlled by refluxing and condensing apparatus.

Examples of such non-volatile process fluids are as follows: hydrocarbons (such as mineral oil, paraffin oil, or aromatic oil), diphenyl oxide fluids, silicone oils, polyglycol ethers or vegetable oils, etc., solely the dispersant, or any combinations thereof.

The non-volatile process fluid should contain a dispersant(s) capable of retaining the zinc compound formed by decomposition in stable suspension. Any suitable dispersant which is relatively stable under the high temperature conditions of this invention can be employed.

These are illustrated by the following: saturated and unsaturated fatty acids (such as stearic acid and oleic acid) and derivatives thereof (such as sorbitan monooleate), naphthenaic acids, oxyalkylated fatty amines, alkylphenols, sulfurized alkylphenols, oxyalkylated alkylphenols, etc.

In the event that an above-mentioned organic carboxylic acid or any combination thereof is to be used as the dispersant, it is to be understood that it is to react with a basic compound of an alkali(ne earth) metal to form a salt or other complex which is to be soluble in the process oil. Such a salt or complex of a carboxylic acid moiety is formed by the reaction of an equivalent of basic metal moiety (such as, for example, calcium oxide, magnesium hydroxide, sodium carbonate, or any mixtures thereof) with a corresponding equivalent of acid moiety.

In the practice of this invention, temperatures of about 275° to 450° C. are employed, such as from about 290° C. to 400° C., but preferably from about 300° C. to 350° C.

The particle size of the resulting ZnO so formed for dispersion in general should be of a size which is stable and fluid. In practice, the particle size is no greater than about 5 microns, such as no greater than about 2 microns, but preferably no greater than about one micron.

The concentration of the zinc compound so formed and dispersed in the non-volatile process fluid should be no greater than that concentration which maintains suitable fluidity. In general, the final concentration based on nonvolatile fluid and other materials is from about 1% to 29% when calculated as percent zinc, such as from about 2% to 27%, for example, from about 3% to 25%, but preferably from about 4% to 23%.

The concentration of the dispersant in the nonvolatile process fluid should be sufficient to maintain a fluid, stable dispersion of zinc oxide in the fluid. In general, the weight concentration of dispersant and non-volatile fluid may range from 100% dispersant and 0% nonvolatile fluid to as little as 0.01% dispersant and 99.99% fluid, such as from about 95% and 5%, for example from about 90% to 10%, but preferably from about 85% to 15% dispersant.

Although we do not wish to be bound by actual theory, we believe that the formation of dispersible zinc oxide results from the in situ formation of highly porous and sub-micron sized ZnO at its decomposition temperature. In such a form the resulting ZnO is immediately dispersed and stabilized by the action of the dispersing agent. Prior art procedures do not prepare ZnO dispersions by employing the high temperature decomposition of zinc acetate directly in the dispersing fluid which is necessary for the product and process of this invention, and therefore, do not achieve a stable dispersible zinc oxide but instead attempt to achieve zinc dispersibility through suspensions of solid zinc compounds, such as zinc oxide which suspensions are white and eventually settle out rather than the stable dispersions of this invention.

The following examples are presented for purposes of illustration and not of limitation.

EXAMPLE 1

Aqueous zinc acetate was made readily by allowing 120 g acetic acid to react with 81.4 g zinc oxide in water at temperatures less than 100° C.

EXAMPLE 2

Magnesium naphthenate was made by allowing 48.4 g naphthenic acid in 297.6 g hydrocarbon process oil to react with 4.4 g magnesium hydroxide at a temperature up to 220° C. Upon the removal of $H_2O$ and some process oil, the resulting product weighed 270.8 g. The magnesium content was calculated at about 0.68%.

EXAMPLE 3

In a 500 ml. reaction flask were charged 270.8 g of hydrocarbon solution of magnesium naphthenate of Example 2 and 186.1 g of zinc acetate solution of Example 1. Such a composition provided the metal atoms in a ratio of 3.077 atoms of zinc to 1 atom of magnesium. The reaction mass was heated to distill out the water used in dissolving the zinc acetate; further heating to 300° C. decomposed the resulting slurry of zinc acetate to the desired zinc oxide dispersion. The final temperature was 316° C. The resulting product weighed 268.9 g. The material was centrifuged for 5 hours and the amount of insolubles which separated was less than 0.05%. The zinc content was calculated at about 5.65%.

EXAMPLE 4

The ratio of metal atoms (i.e., zinc to magnesium) can be increased by employing a larger amount of the zinc acetate solution as prepared by the procedure of Example 1 with the proportion of magnesium naphthenate of Example 2 using the same conditions described in Example 3. The resulting product contains a greater proportion of dispersed zinc oxide.

The compositions of this invention have a wide variety of uses. They are useful in rubber compounds, paints, corrosion inhibitors, pharmaceutical and cosmetic formulations such as ointments, etc.

We claim:

1. A process of preparing a stable, fluid zinc-containing dispersion which comprises decomposing zinc acetate to ZnO at a temperature above about 270° C. in a dispersant-containing fluid, said fluid being a non-volatile process fluid capable of being heated to the decomposition temperature of zinc acetate, said dispersant being relatively stable under the high temperature conditions of this process and being capable of retaining the zinc compound formed by decomposition in stable suspension and being selected from the group consisting of saturated and unsaturated fatty acids, naphthenic acids and alkali and alkaline earth metal salts thereof, oxyalkylated fatty amines, alkylphenols, sulfurized alkylphenols and oxyalkylated alkylphenols.

2. The process of claim 1 where the dispersant is a saturated or unsaturated acid or alkali or alkaline earth metal salt thereof.

3. The process of claim 2 where the salt is an alkali or alkaline earth metal naphthenate.

4. The process of claim 3 where the salt is magnesium naphthenate.

* * * * *